Figures 1, 2:
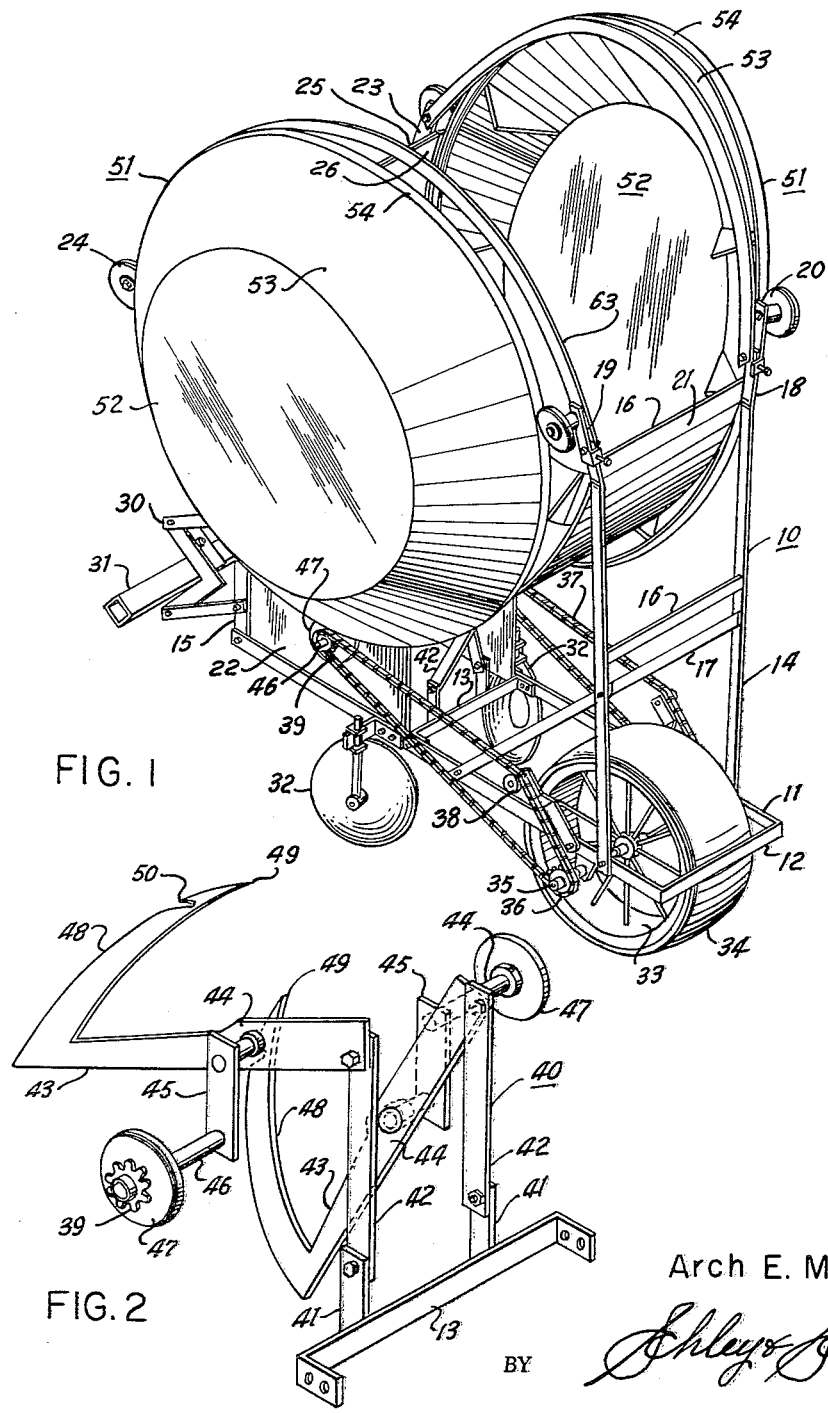

June 8, 1965  A. E. MURRAY  3,187,698

GRASS SPRIG SETTER

Filed Nov. 23, 1962  3 Sheets-Sheet 1

INVENTOR
Arch E. Murray

BY *Shley & Shley*

ATTORNEYS

June 8, 1965

A. E. MURRAY 3,187,698

GRASS SPRIG SETTER

Filed Nov. 23, 1962

3 Sheets-Sheet 2

INVENTOR
Arch E. Murray

BY *Shley & Shley*

ATTORNEYS

June 8, 1965   A. E. MURRAY   3,187,698
GRASS SPRIG SETTER
Filed Nov. 23, 1962   3 Sheets-Sheet 3
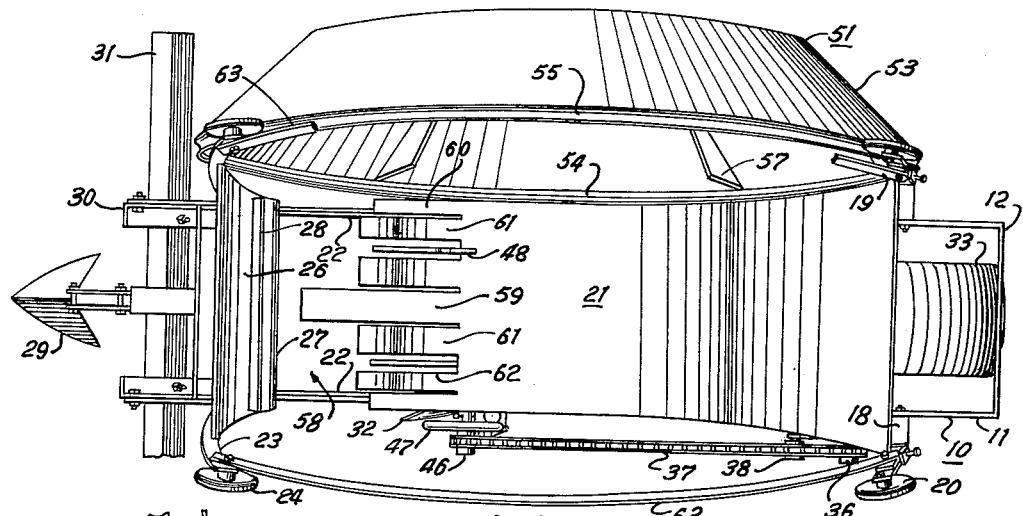
FIG. 5
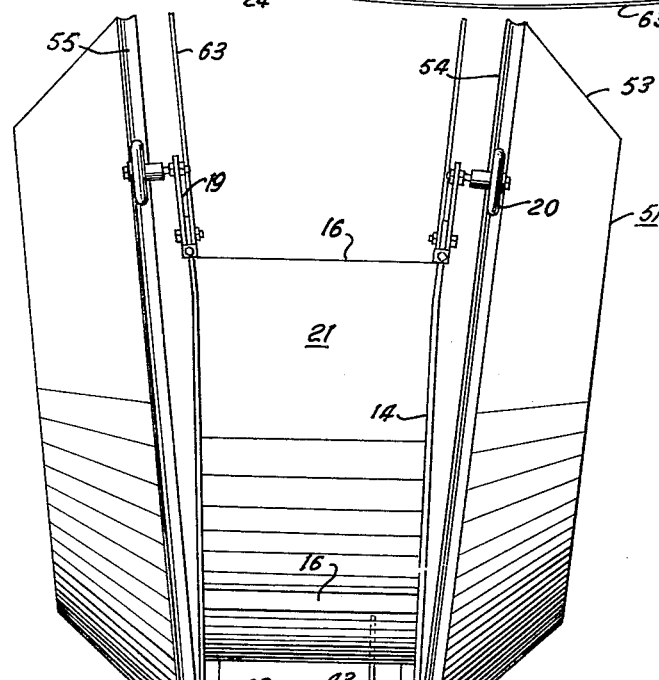
FIG. 6
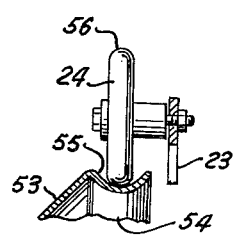
FIG. 7
INVENTOR
Arch E. Murray
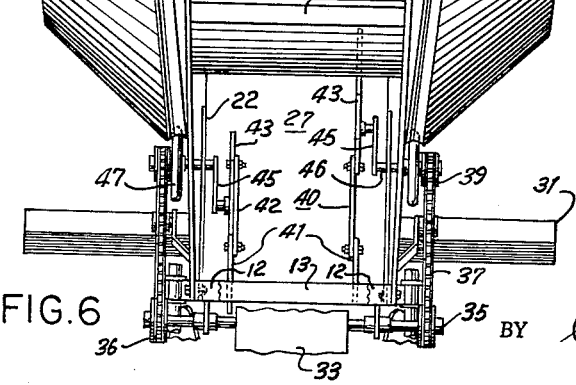
BY
ATTORNEYS United States Patent Office 3,187,698
Patented June 8, 1965

3,187,698
GRASS SPRIG SETTER
Arch E. Murray, Rte. 1, Grapeland, Tex.
Filed Nov. 23, 1962, Ser. No. 239,528
11 Claims. (Cl. 111—2)

This invention relates to new and useful improvements in grass sprig setters.

One object of the invention is to provide an improved setter for sprigs or roots of Bermuda and similar grasses of the rhizome or stolon type.

Another object of the invention is to provide an improved grass sprig setter having hopper means for confining and maintaining grass sprigs in a loose mass by imparting tumbling motion thereto so as to constantly agitate the sprigs and prevent packing thereof, the tumbling motion being in an upright plane extending in the direction of travel of the setter and the mass of sprigs being engageable by pick-up means movable in the same general plane for pulling sprigs from said mass.

A particular object of the invention is to provide an improved setter of the character described, wherein the hopper means has a discharge opening underlying the loose mass of grass sprigs for accommodating upward and downward movement of the pick-up means into and out of the hopper means and through at least the lower portion of said mass, the opening having a restricted portion through which the pick-up means enters and an enlarged portion through said means and its snagged sprig exit from said hopper means.

A further object of the invention is to provide an improved setter, of the character described, wherein the hopper means is formed by the coaction of a pair of upright revolving drums with plate means disposed between the lower portions thereof and curved about a horizontal axis, the drums being inclined so to converge downwardly toward the plate means for directing the mass of grass sprigs inwardly and having means for engaging said mass to impart tumbling motion thereto and prevent packing of the sprigs.

An important object of the invention is to provide an improved setter, of the character described, wherein the pick-up means includes an angular element having hook means at its outer end portion for upward and rearward movement through the restricted portion of the discharge opening and downward and forward movement through the enlarged portion of said opening as well as through the lower portion of the loose mass of grass sprigs.

Another object of the invention is to provide an improved setter, of the character described, having crank means for moving the angular element and its hook means in an uprightly-elongated, substantially elliptical path whereby, at the end of the upstroke of said element, the hook means is moved forwardly of the restricted portion of the discharge opening for downward arcuate movement through the enlarged portion of said opening.

A construction designed to carry out the invention will be hereinafter described, together with other features of the invention.

Figure 3:
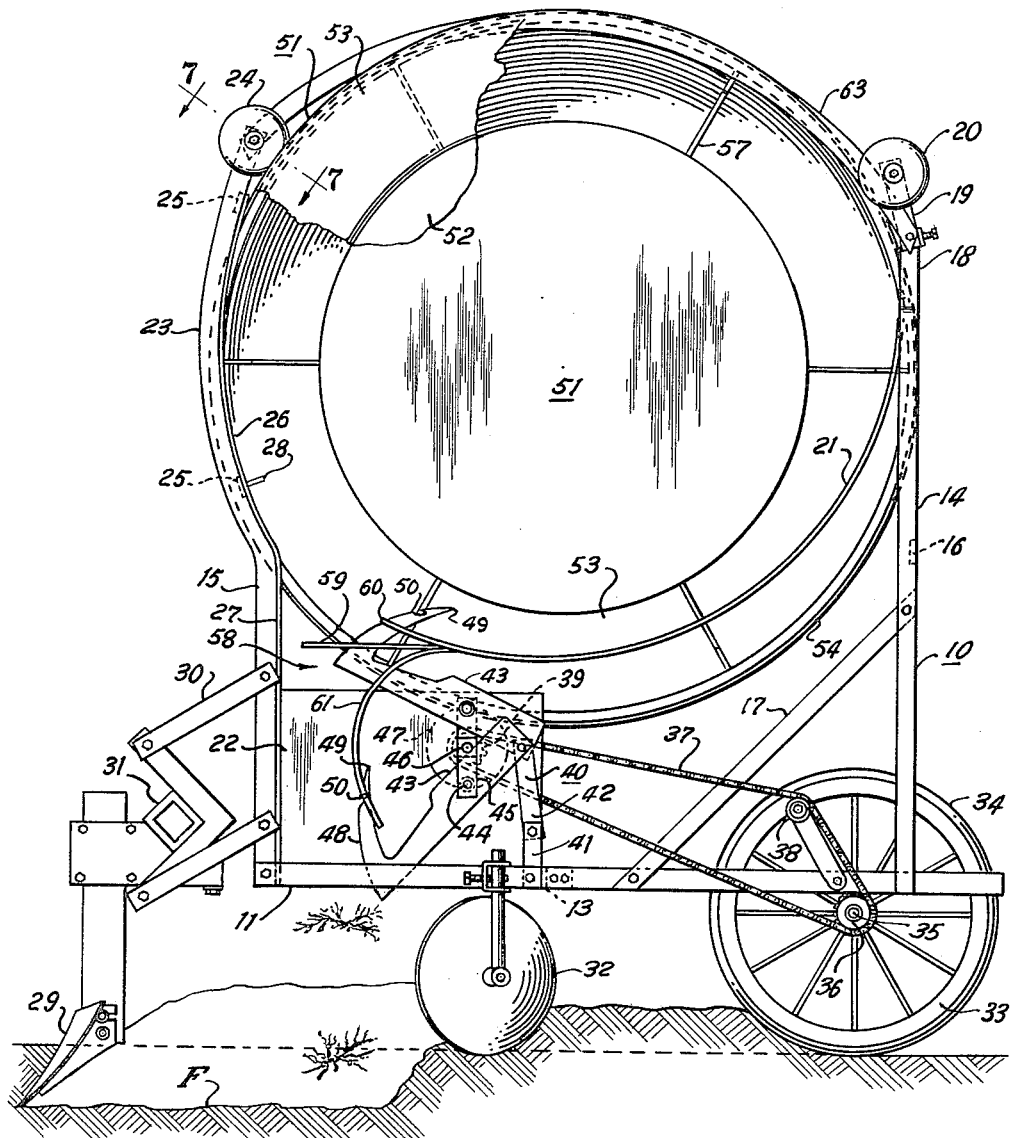
Figure 4:
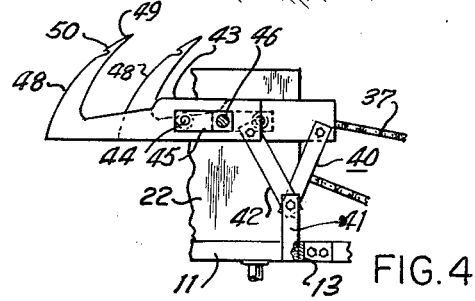

The invention will be more readily understood from a reading of the following specification and by reference to the accompanying drawings, wherein an example of the invention is shown, and wherein:

FIG. 1 is a perspective view of a grass sprig setter constructed in accordance with the invention, FIG. 2 is a perspective view of the crank assembly with its fingers for picking up the grass sprigs in their uppermost and lowermost positions, FIG. 3 is a side elevational view of the setter with portions broken away to show the hopper provided by the coaction of the drums and its discharge opening and the crank assembly, FIG. 4 is a side elevational view of the crank assembly with its pick-up fingers in their forwardmost and rearwardmost positions, FIG. 5 is a top plan view of the setter with one of the drums removed, FIG. 6 is a rear elevational view of the setter, and FIG. 7 is an enlarged, cross-sectional view, taken on the line 7—7 of FIG. 3.

In the drawings, the numeral 10 designates the frame of a setter for sprigs or roots of Bermuda and similar grasses of the rhizome or stolon type. The frame 10 includes a pair of horizontal, longitudinal frame members 11, connected in parallel relation by horizontal, rear end and intermediate cross bars or members 12 and 13, having upright legs or members 14 and 15 upstanding from their rear end portions and front ends, respectively. Cross bars 16 extend horizontally between the upper end and intermediate portions of the rear upright legs 14, which are substantially rectilinear and vertical, and diagonal braces 17 extend forwardly from said intermediate portions to the intermediate portions of the frame members 11. As shown by the numeral 18, the upper end of each leg 14 is bent laterally outward and has a bracket 19 adjustably and removably mounted thereon for supporting a roller 20 at an outward and upward inclination. (FIGS. 5 and 6). An arcuate or curved bottom member or plate 21 is suspended from the upper cross bar 16 so as to extend downwardly and forwardly and terminate adjacent the front upright legs 15, as shown in FIG. 3 and as will be explained.

Each leg 15 is connected to each frame member 11 by an upright, flat side plate 22 which extends rearwardly to the cross bar 13. The upper portions 23 of the front upright legs are bowed or curved forwardly and inclined laterally outward to support rollers 24 at an outward and upward inclination in substantial alinement with the rollers 20 (FIGS. 3 and 5). It is noted that the front rollers 24 are disposed at a slightly lower elevation than the rear rollers 20, the mounting of said front rollers being shown in FIG. 7. As shown in FIG. 1 and by the broken lines in FIG. 3, cross bars 25 extend transversely between the upper and intermediate portions of the upright legs 15 for reinforcing said legs and supporting an arcuate or curved front member or plate 26. Although the upper portion of the plate 26 is complementary to the curvature of the upper portions 23 of the upright legs, its lower portion 27 is flat and complementary to and coextensive with the lower portions of said legs which are substantially rectilinear and vertical and which extend above the lowermost portion of the plate 21. Preferably, a horizontal baffle 28 extends transversely of the concave inner surface of the front plate a short distance about its flat lower portion 27. For opening a trench or furrow F, a plow 29 is mounted on the lower portion of the legs 15 by a suitable bracket assembly 30 so as to project forwardly of the frame 10. The bracket assembly 30 may include a draw bar or tool 31 for attaching the setter to a tractor (not shown). Disc-type plows 32 are suitably suspended from the frame members 11 adjacent the cross bar 13 to close the furrow in the usual manner.

A ground wheel 33, having a broad rim or tire 34, is mounted on a transverse axle or shaft 35 which is suitably mounted for rotation on the frame members adjacent the rear end bar 12. Since the wheel 33 is alined with the opening plow 29, it serves as a press or tamp wheel as well as a drive wheel. The ends of the axle 35 project laterally outward of the members 11 and have sprockets 36 fixed thereon for driving a pair of endless chains 37 upon rotation of the wheel. Each chain 37 extends forwardly over an idler 38 upstanding from each frame member for driving connection with a sprocket 39 which forms a part of a crank assembly 40 mounted between the upper, rear portions of the upright plates 22. The crank assembly 40 is partially supported by the cross bar 13 and has a pair of spaced short bars or legs 41 upstanding therefrom (FIG. 2). An elongated, upright link 42 has it lower end pivotally attached to the upper end of each leg 41 and its upper end pivotally connected to the rear end of an angular or hook-like forwardly extending element or finger 43. Shortly forward of its rear end, each finger 43 has a horizontal, transverse pin 44 journaled therein for pivotal connection with one end of a crank arm 45 from the other end of which a stub shaft 46 extends laterally outward in parallel relation to the pin. A roller 47, similar to the rear and front rollers 20 and 24, and one of the sprockets 39 are fixed on the outer end of each shaft 46 externally of each plate 22 through which the shaft projects and in which said shaft is journaled to complete the support for the crank assembly.

The stub shafts 46 are in axial alinement and the crank arms 45 are offset 180° relative to each other whereby one arm extends upwardly from its shaft when the other arm extends downwardly from its shaft so as to dispose one of the pivot pins 44 and fingers 43 upwardly and the other pivot pin and arm downwardly. Due to the counterclockwise rotation of the ground wheel 33 and sprockets 39, the shafts revolve the pivot pins and arms in the same direction to impart counterclockwise movement to the fingers in an uprightly-elongated substantially elliptical path (FIGS. 2–4). This movement is permitted by the oscillation of the links 42 about their pivotal connections with the legs 41, being substantially vertical upwardly and in a forward arc downwardly. An arcuate or curved arm or bill 48, of appreciable length, extends at an acute angle upwardly from the front end of each finger 43 and tapers to a sharp end or point 49. Since the bill is curved toward the finger, the point of said bill is directed rearwardly when said finger is uppermost and is directed upwardly when said finger is lowermost. As shown by the numeral 50, the front margin of each bill 48 is recessed or slotted adjacent the point 49 to provide a barb or hook which is directed downwardly when the bill and its finger are uppermost and is directed downwardly when said bill and finger are lowermost as well as during most of the movement of said finger.

The rollers 47 coact with the rollers 20 and 24 and are disposed laterally inward thereof to rotatably support a pair of opposed, shallow baskets or drums 51 at an upward and outward inclination whereby the drums converge downwardly. Each drum 51 has a flat, circular bottom or end wall 52, of relatively large diameter, and an outwardly-inclined side wall 53 whereby the drum is dish-shaped or frusto-conical. It is noted that the inclination of the side walls 53 is much greater than the inclination of the drums so that the lower portions of said side walls are inclined downwardly inward when said drums are mounted on the rollers. An annular lip or rim 54, concavo-convex in cross-section as best shown in FIG. 7, is provided on the outer periphery of the side wall to provide an external, annular groove or track 55 for the rollers. Preferably, each of the rollers has its rim or tire 56 convexly arced or curved transversely in substantial conformity with the transverse, concave curvature of the track, although being of less width. Each drum is supported by its rim 54 resting on one of the rollers 47 and confined against displacement by the engagement of said roller as well as the rollers 20 and 24 in the track 55, the latter rollers being disposed above the center of the drum so as to overlie its rim. The adjustability of the mounting brackets 19 of the rollers 20 permits insertion and removal of the drums as well as accurate positioning of said drums.

A plurality of equally-spaced, internal blades or fins 57 extend radially of the side wall 53 of each drum 51 substantially throughout the width thereof to tumble the grass sprigs confined by the hopper formed by the co-action of the drums with the plates 21 and 26 upon clockwise rotation of said drums by the counterclockwise rotation of the rollers 47. Since the major portion of the sprigs are disposed medially of the hopper in a loose mass, being directed inwardly by the inclination of the drums and their side walls, the fins 57 are triangular and increase in width outwardly toward the rims 54. Although terminating short of the rims, the outer end portions of the fins are of greater width than said rims and project radially therebeyond for more contact with the sprigs and increased agitation thereof. The curvature of the plates 21 and 26 may conform substantially to the circumference of the drums; however, said plate 21 has its major portion disposed about the lower portions of said drums and substantially midway of the inner and outer peripheral margins of the inclined side walls 53 whereby the rims and the outer portions of said walls and their fins pass below said plate. As a result, the mass of sprigs within the hopper rests upon the plate 21 above the lower portions of the drums while being tumbled and urged toward the front plate 26 by the clockwise rotation of said drums.

As shown in FIGS. 3 and 5, the major portion of the plate 21 terminates a short distance forwardly of the axis of rotation of the stub shafts 46 and their rollers 47 to provide a discharge opening 58 in registration with the space between the upright, flat side plates 22 and adjacent the upright, flat lower portion 27 of the front plate 26, which plates provide side walls for the opening. An elongated, narrow, flat extension or element 59 projects medially of and horizontally from the front end of the plate 21, terminating short of the front plate, to support the sprigs and prevent the discharge of excessive quantities thereof. A similar supporting extension or element 60 projects forwardly from each longitudinal margin of the plate 21, but is of much less length and is curved upwardly on the radius of said plate so as to form a continuation thereof. Between each of the elements 59 and 60, the plate 21 has a pair of somewhat similar extensions or elements 61 extending forwardly therefrom and curved downwardly in arc substantially about the axis of the stub shafts. The outermost element 61 of each pair is welded or otherwise secured to the side plates 22 for supporting the front end portion of the plate 21. As shown in FIG. 3, the elements 61 are of appreciable length so as to extend to the lower portions of the side plates. In addition to reducing the size of the rear portion of the discharge opening 58, elements 61 of each pair are spaced apart to provide an elongated, narrow opening or slot 62 (FIG. 5) therebetween for accommodating the bill 48 and hook 50 of one of the fingers 43 of the crank assembly 40 and permitting said bill and hook to enter the hopper.

It is noted that the baffle 28 is disposed above and forwardly of the discharge opening 58 and resists upward movement of the clockwise tumbling mass of sprigs so as to maintain said mass adjacent said opening and ensure full contact of the hooks of the fingers therewith. The fingers 43 and their bills 48 are of sufficient length to project the hooks 50 an appreciable distance into the hopper upon upward movement of said fingers. As shown in FIG. 3, each bill and its hook passes upwardly through one of the slots 62 and upwardly and slightly rearward through the lower portion of the hopper and the mass of sprigs therein on the upstroke of its finger. This upward and rearward movement is facilitated by the point 49 of each bill 48 as well as the inclination of the hook 50. Upon continued counterclockwise movement of the finger 43, its bill moves forwardly and downwardly through the sprigs and the forwardly-directed hook snags or picks up a sprig and pulls or carries it through the front portion of the discharge opening which is relatively large and unobstructed except for the medial element 59. It is noted that the forward movement of the finger permits the hook and its snagged sprig to clear the slot upon the downstroke of said finger.

Due to the angular relationship of each bill to its finger, the hook is turned downwardly during substantially all of the movement of the finger except in the vicinity of the end of its upstroke. Consequently, the sprig snagged by the hook 50 is permitted to drop therefrom on the downstroke of the finger through the discharge opening 58. Since the hook is directed downwardly through the major portion of the upstroke of the finger as well as throughout its downstroke, ample time is provided for the sprig to drop from said hook. If the sprig clings to the bill or its hook, it is stripped therefrom by the adjacent downwardly curved elements 61. The sprigs fall into the furrow F and are covered by the soil being pushed into said furrow by the disc-type plows 32, said soil being pressed down by the ground wheel 33. As shown in FIG. 3, one of the fingers 43 picks up a sprig when the other finger is dropping or depositing a sprig in the furrow whereby the sprigs are planted at uniform intervals without crowding or skipping. Due to the inclined drums 51 and the clockwise rotation thereof, the fins 57 constantly impart clockwise tumbling motion to the sprigs and maintain said sprigs in a loose mass for positive engagement by the hooks 50 of the fingers. The inclination of the drums increases the capacity of the hopper and facilitates the loading thereof. Preferably, the upper end of each rear upright leg 14 of the frame 10 is connected to the extremity of the upper portion 23 of each front leg 15 by an arcuate tie bar 63 to prevent spreading apart of said legs.

The foregoing description of the invention is explanatory thereof and various changes in the size, shape and materials, as well as in the details of the illustrated construction may be made, within the scope of the appended claims, without departing from the spirit of the invention.

What I claim and desire to secure by Letters Patent is:

1. A grass sprig setter including a frame, a pair of opposed dish-shaped spaced drums having open ends facing and communicating with each other, the drums being mounted on the frame for rotation in upright planes extending in the general direction of travel of the sprig setter, support means disposed between the lower portions of said drums and closing at least a portion of the space therebetween, the support means having a discharge opening and coacting with said drums to define a single unitary hopper-like enclosure for confining and maintaining grass sprigs in a loose mass between said lower portions of said drums, means on the interior peripheral portions of said drums for engaging the sprigs to impart upright tumbling motion to the mass of sprigs upon rotation of said drums, pick-up means movable in an upright plane through the discharge opening and at least the lower portion of said tumbling mass of sprigs for pulling a sprig therefrom downwardly through said opening and depositing the pulled sprig on the ground, and means for imparting rotation to said drums and for driving the pick-up means, said drums being inclined so as to converge downwardly toward said support means for directing said mass of sprigs inwardly as well as for increasing the capacity of the hopper-like enclosure and facilitating the loading of said enclosure.

2. A grass sprig setter including a frame, a pair of opposed dish-shaped spaced drums having open ends facing and communicating with each other, the drums being mounted on the frame for rotation in upright planes extending in the general direction of travel of the sprig setter, support means disposed between the lower portions of said drums and closing at least a portion of the space therebetween, the support means having a discharge opening and coacting with said drums to define a single unitary hopper-like enclosure for confining and maintaining grass sprigs in a loose mass between said lower portions of said drums, means on the interior peripheral portions of said drums for engaging the sprigs to impart upright tumbling motion to the mass of sprigs upon rotation of said drums, pick-up means movable in an upright plane through the discharge opening and at least the lower portion of said tumbling mass of sprigs for pulling a sprig therefrom downwardly through said opening and depositing the pulled sprig on the ground, and means for imparting rotation to said drums for driving the pick-up means, said discharge opening being disposed forwardly of the centers of said drums which are rotated clockwise to tumble the mass of sprigs toward said opening, the rear portion of said opening being of restricted width relative to the front portion of said opening to prevent the passage of sprigs therethrough, said pick-up means passing upwardly through said rear portion and downwardly through said front portion of said opening.

3. A grass sprig setter as set forth in claim 2 including means extending forwardly and downwardly from the rear portion of the discharge opening to restrict the width of said portion and to strip sprigs from the pick-up means during the lower portion of movement of said pick-up means, the support means having a bottom member extending rearwardly and upwardly from said opening rear portion to the rear portions of said drums and a front member extending from the front portion of said opening to the front portions of said drums, and means on the front member adjacent said opening for resisting upward movement of the mass of sprigs.

4. A grass sprig setter as set forth in claim 3 wherein the pick-up means includes an angular element having hook means at its outer end portion movable upwardly through the rear portion of the discharge opening and downwardly through the front portion of said opening.

5. A grass sprig setter as set forth in claim 3 wherein the pick-up means includes an angular element mounted for movement in an uprightly-elongated substantially elliptical path and having hook means at its outer end portion which passes upwardly and rearwardly through the rear portion of the discharge opening and then forwardly and downwardly through the front portion of said opening.

6. A grass sprig setter as set forth in claim 2 wherein the support means includes a bottom member extending rearwardly and upwardly from the rear portion of the discharge opening to the rear portions of the drums and a front member extending upwardly and forwardly from the front portion of said opening to the front portions of said drums, and means on said front member adjacent said opening for resisting upward movement of the mass of sprigs.

7. A grass sprig setter including a frame, a pair of opposed dish-shaped spaced drums having open ends facing and communicating with each other, the drums being mounted on the frame for rotation in upright planes extending in the general direction of travel of the sprig setter, support means disposed between the lower portions of said drums and closing at least a portion of the space therebetween, the support means having a discharge opening and coacting with said drums to define a single unitary hopper-like enclosure for confining and maintaining grass sprigs in a loose mass between said lower portions of said drums, means on the interior peripheral portions of said drums for engaging the sprigs to impart upright tumbling motion to the mass of sprigs upon rotation of said drums, pick-up means movable in an upright plane through the discharge opening and at least the lower portion of said tumbling mass of sprigs for pulling a sprig therefrom downwardly through said opening and depositing the pulled sprig on the ground, means for imparting rotation to said drums and for driving the pick-up means, the support means having a bottom member extending rearwardly and upwardly from said opening rear portion to the rear portions of said drums and a front member extending from the front portion of said opening to the front portions of said drums, and means on the front member adjacent said opening for resisting upward movement of the mass of sprigs.

8. A grass sprig setter including a frame, a pair of opposed dish-shaped spaced drums having open ends facing and communicating with each other, the drums being mounted on the frame for rotation in upright planes extending in the general direction of travel of the sprig setter, support means disposed between the lower portions of said drums and closing at least a portion of the space therebetween, the support means having a discharge opening and coacting with said drums to define a single unitary hopper-like enclosure for confining and maintaining grass sprigs in a loose mass between said lower portions of said drums, means on the interior peripheral portions of said drums for engaging the sprigs to impart upright tumbling motion to the mass of sprigs upon rotation of said drums, pick-up means movable in an upright plane through the discharge opening and at least the lower portion of said tumbling mass of sprigs for pulling a sprig therefrom downwardly through said opening and depositing the pulled sprig on the ground, and means for imparting rotation to said drums and for driving the pick-up means, said pick-up means including an angular element mounted for movement in an uprightly-elongated substantially elliptical path and having a downwardly directed hook at its outer end portion which passes upwardly and rearwardly through the rear portion of said discharge opening and then forwardly and downwardly through the front portion of said opening.

9. A grass sprig setter including a frame, a pair of opposed dish-shaped spaced drums having open ends facing and communicating with each other, the drums being mounted on the frame for rotation in upright planes extending in the general direction of travel of the sprig setter, support means disposed between the lower portions of said drums and closing at least a portion of the space therebetween, the support means having a discharge opening and coacting with said drums to define a single unitary hopper-like enclosure for confining and maintaining grass sprigs in a loose mass between said lower portions of said drums, means on the interior peripheral portions of said drums for engaging the sprigs to impart upright tumbling motion to the mass of sprigs upon rotation of said drums, pick-up means movable in an upright plane through the discharge opening and at least the lower portion of said tumbling mass of sprigs for pulling a sprig therefrom downwardly through said opening and depositing the pulled sprig on the ground, and means for imparting rotation to said drums and for driving the pick-up means, the rear portion of said opening being of restricted width relative to the front portion of said opening to prevent the passage of sprigs therethrough, said pick-up means passing upwardly through said rear portion and downwardly through said front portion of said opening.

10. A grass sprig setter as set forth in claim 9 wherein the support means includes a bottom member curved rearwardly and upwardly from the rear portion of the discharge opening to the rear portions of the drums and a front member extending upwardly and forwardly from the front portion of said opening to the front portions of said drums, and means on said front member adjacent said opening for resisting upward movement of the mass of sprigs.

11. A grass sprig setter including a frame, a pair of opposed dish-shaped spaced drums having open ends facing and communicating with each other, the drums being mounted on the frame for rotation in upright planes extending in the general direction of travel of the sprig setter, support means disposed between the lower portions of said drums and closing at least a portion of the space therebetween, the support means having a discharge opening and coacting with said drums to define a single unitary hopper-like enclosure for confining and maintaining grass sprigs in a loose mass between said lower portions of said drums, means on the interior peripheral portions of said drums for engaging the sprigs to impart upright tumbling motion to the mass of sprigs upon rotation of said drums, pick-up means movable in an upright plane through the discharge opening and at least the lower portion of said tumbling mass of sprigs for pulling a sprig therefrom downwardly through said opening and depositing the pulled sprig on the ground, and means for imparting rotation to said drums and for driving the pick-up means, said pick-up means including a crank assembly having a pair of angular elements in opposed relationship to each other whereby one of the elements is uppermost when the other of said elements is lowermost, each of said elements being mounted for movement in an uprightly-elongated substantially elliptical path and having a downwardly directed hook at its outer end portion which passes upwardly and rearwardly through the rear portion of said discharge opening and then forwardly and downwardly through the front portion of said opening.

References Cited by the Examiner

UNITED STATES PATENTS

| 101,947 | 4/70 | Trump | 111—74 X |
|---|---|---|---|
| 545,837 | 9/95 | Baker | 221—216 X |
| 1,606,185 | 11/26 | Ross | 221—200 |
| 1,972,325 | 9/34 | Acasio | 111—3 |
| 2,889,959 | 6/59 | Landgraf | 111—3 X |
| 3,026,001 | 3/62 | Landgraf | 111—3 X |

FOREIGN PATENTS 854,117   1/53   Germany.

ABRAHAM G. STONE, *Primary Examiner.*

WILLIAM A. SMITH III, *Examiner.*